United States Patent [19]
Hochstatter

[11] Patent Number: 4,522,454
[45] Date of Patent: Jun. 11, 1985

[54] LINEAR SLIDE
[75] Inventor: Brian R. Hochstatter, Kankakee County, Ill.
[73] Assignee: Emerson Electric Co., St. Louis, Mo.
[21] Appl. No.: 462,837
[22] Filed: Feb. 2, 1983

Related U.S. Application Data
[62] Division of Ser. No. 261,258, May 6, 1981, Pat. No. 4,453,691.
[51] Int. Cl.³ .............................................. F16C 29/02
[52] U.S. Cl. ..................................... 308/3 R; 248/429
[58] Field of Search ............... 308/3 R, 3 A, 3.6, 6 R; 312/341 NR; 248/122, 124, 125, 298, 429; 83/471.3, 486.1, 488, 581; 144/134 B, 134 C

[56] References Cited
U.S. PATENT DOCUMENTS

| | | | |
|---|---|---|---|
| 2,759,773 | 8/1956 | Wilmer et al. | 308/3.6 |
| 3,526,938 | 9/1970 | Grabher | 308/3 R X |
| 3,537,762 | 11/1970 | Lodige | 308/3 R |
| 3,679,274 | 7/1972 | Nance | 312/341 NR |
| 3,751,120 | 8/1973 | Kietz | 308/3 A |
| 3,847,452 | 11/1974 | Harder, Jr. | 308/6 R |

FOREIGN PATENT DOCUMENTS
2312391 12/1976 France .............................. 248/429

Primary Examiner—Stuart S. Levy
Assistant Examiner—David Werner
Attorney, Agent, or Firm—Charles E. Markham

[57] ABSTRACT

The radial arm of a radial arm saw formed of sheet metal has a horizontal top wall and a pair of vertical sidewalls which are formed horizontally inward at their lower edges as to form ledges for supporting the opposite sides of a longitudinally slidable saw carriage thereon, two pair of longitudinally spaced low friction elements mounted on one side of the carriage with the elements of each pair bearing against opposite sides of one vertical sidewall guides the carriage longitudinally on the arm, and two low friction elements mounted in longitudinally spaced relationship along one side of the carriage and resting on one of the ledges and a single low friction element mounted on the other side of the carriage midway between the two support the carriage vertically on three points.

2 Claims, 25 Drawing Figures

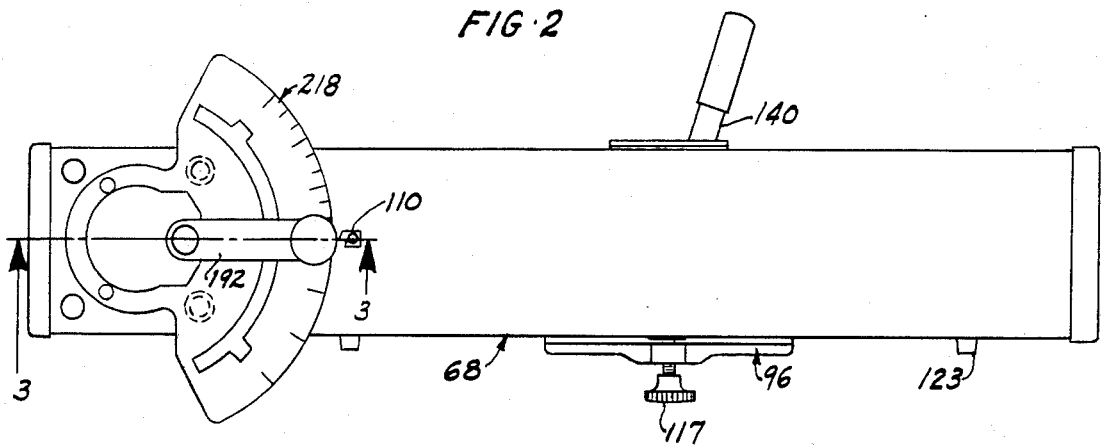
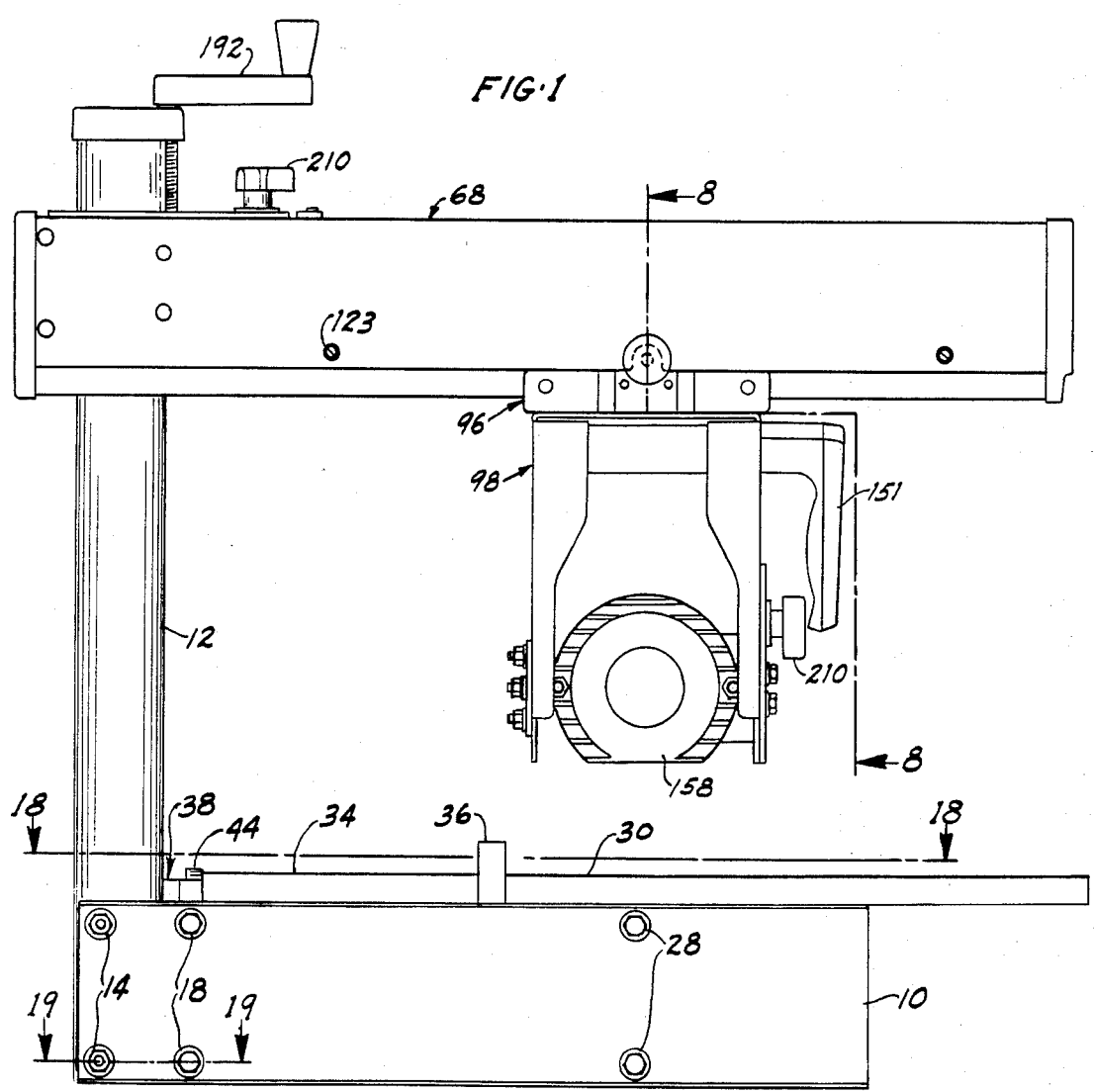

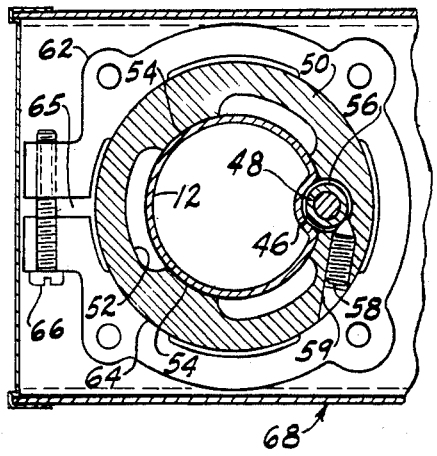
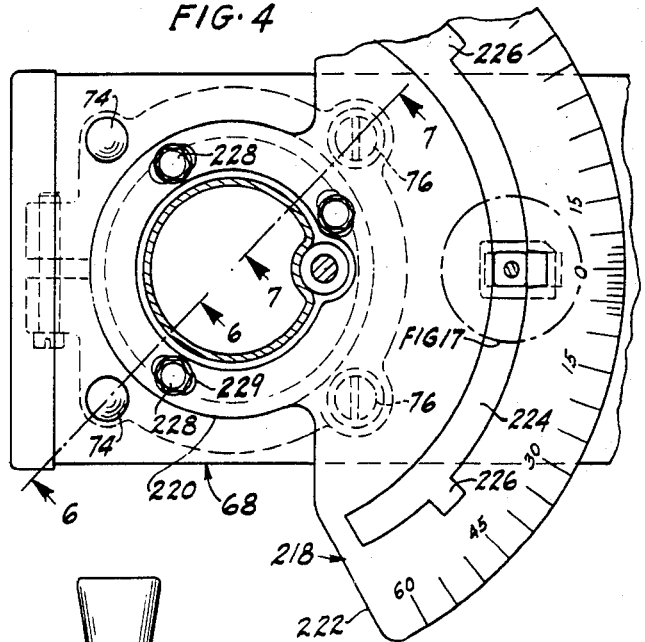
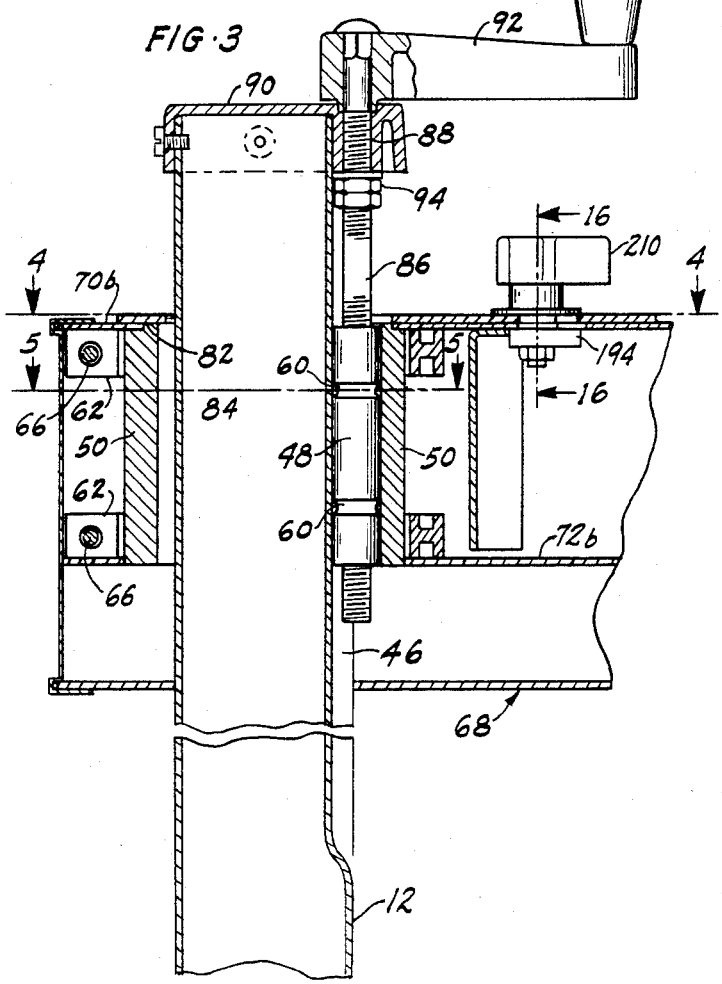
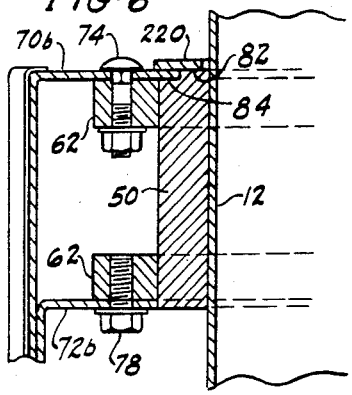
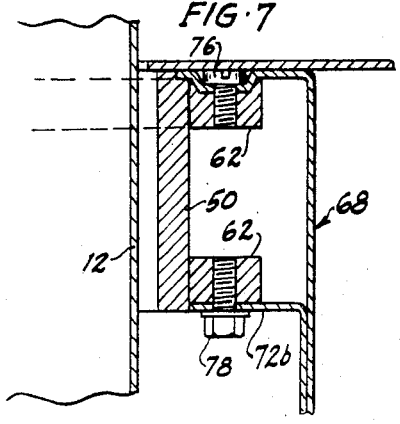

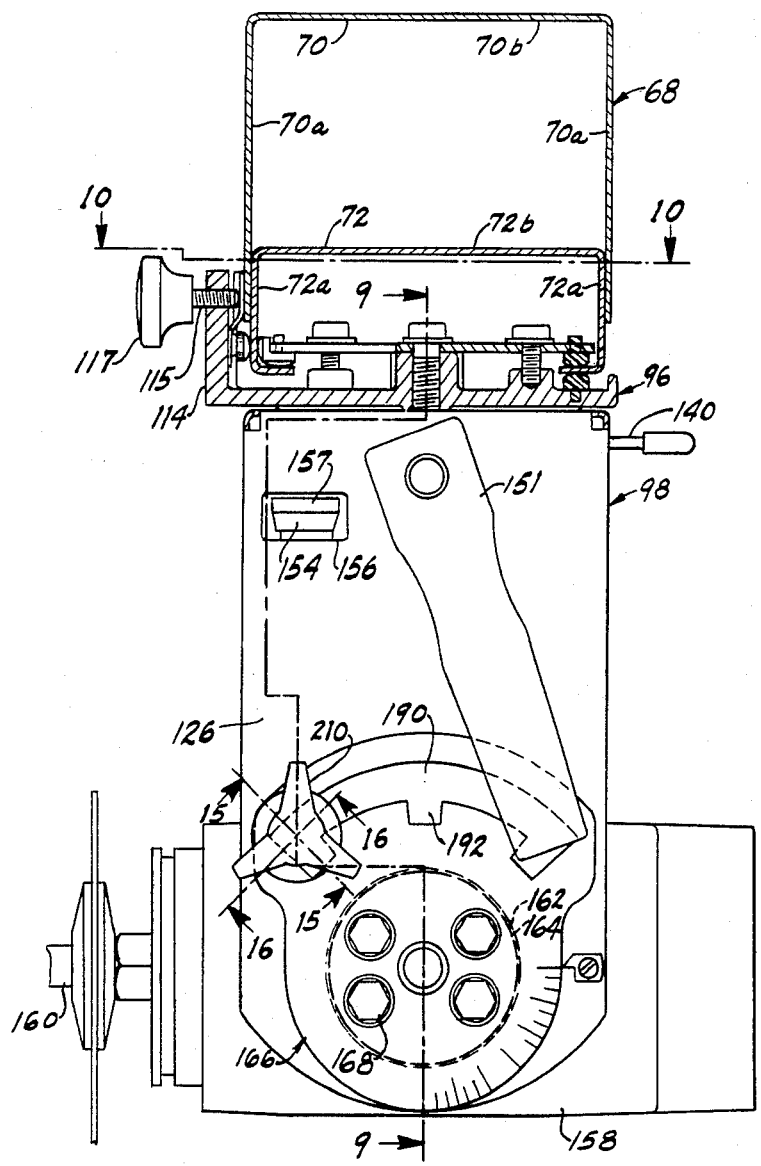
FIG·8
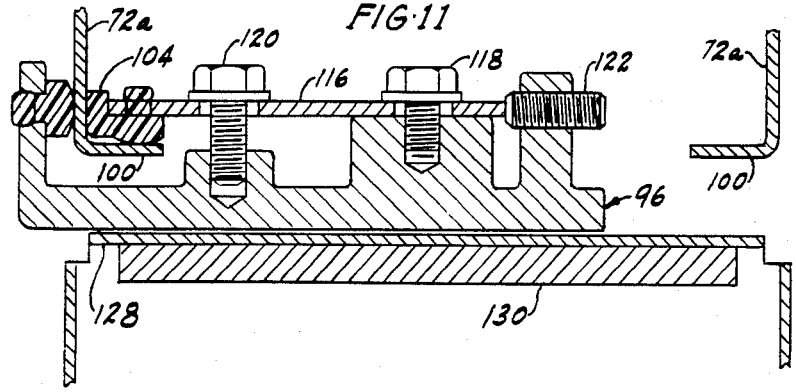
FIG·11

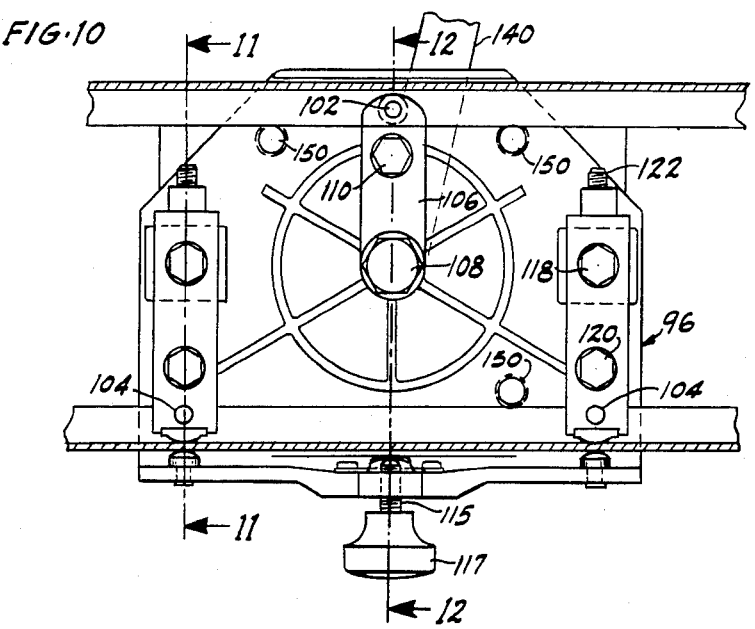
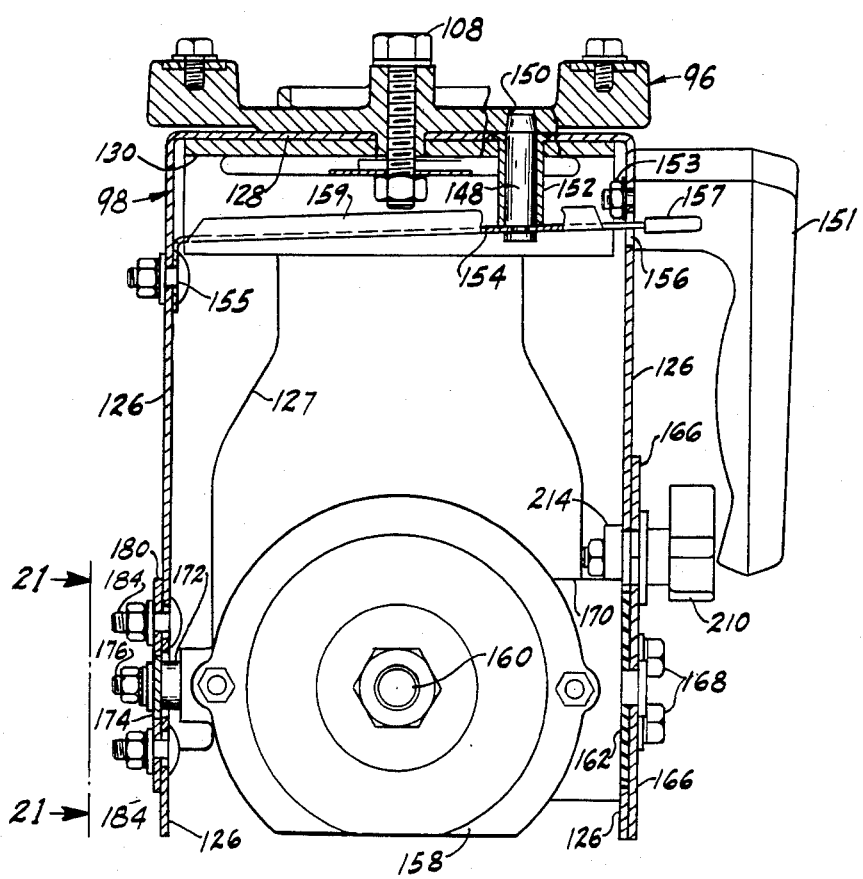

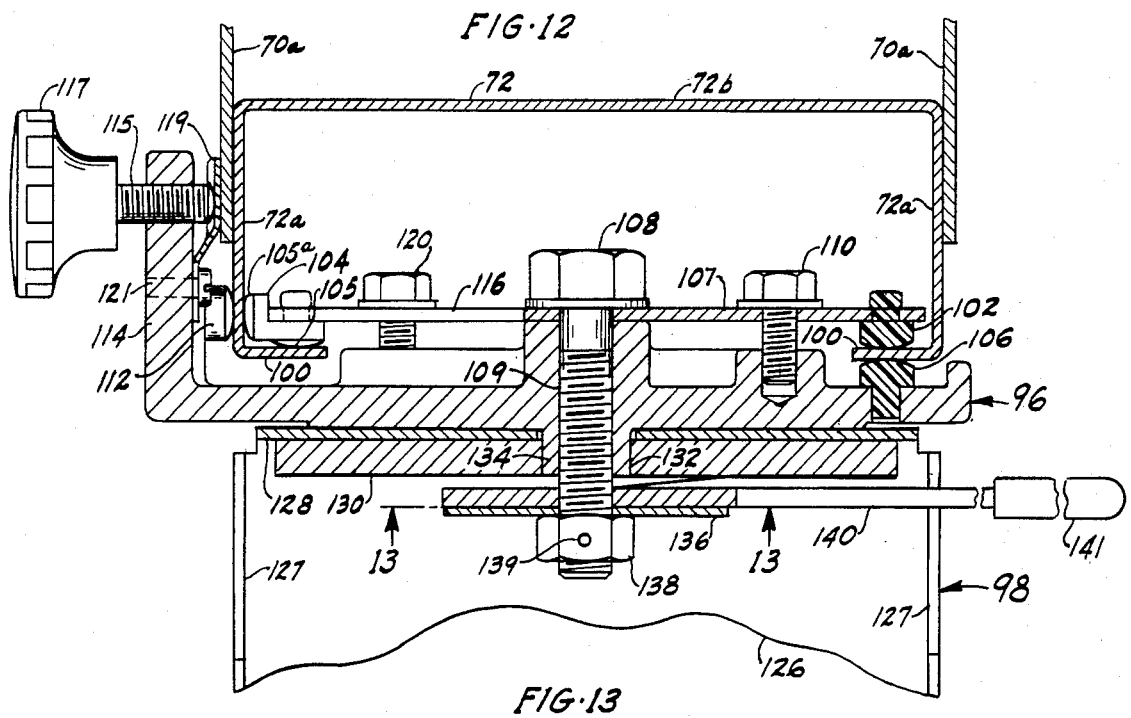
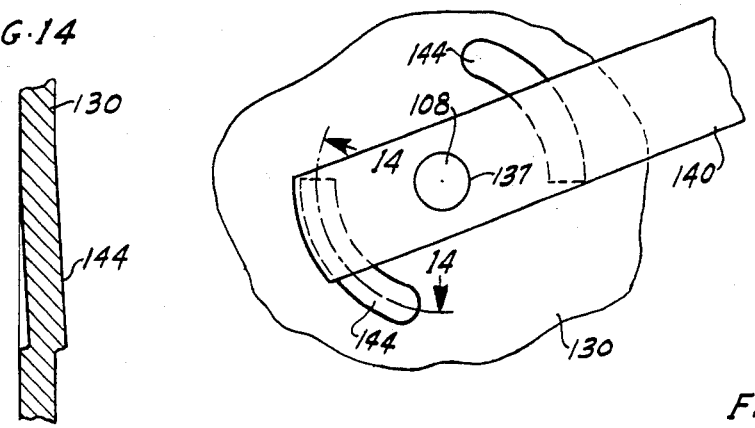
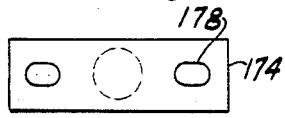
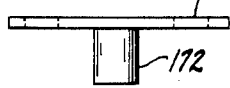
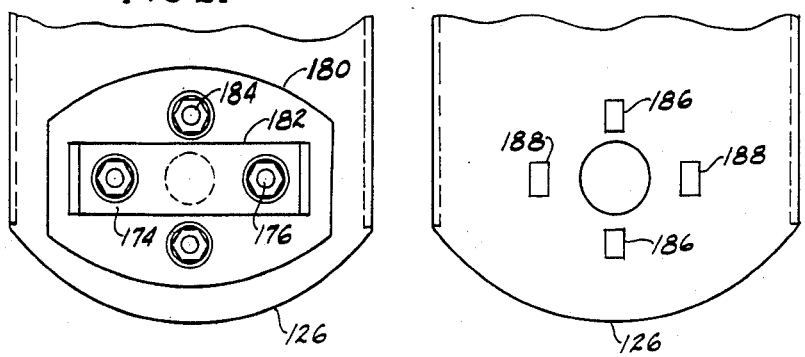

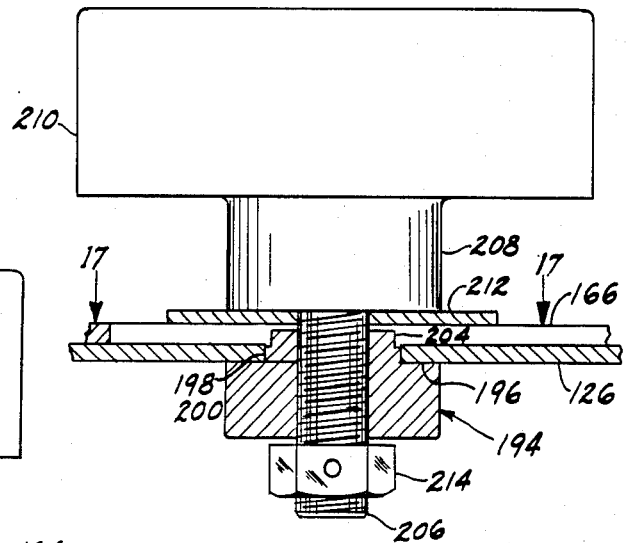
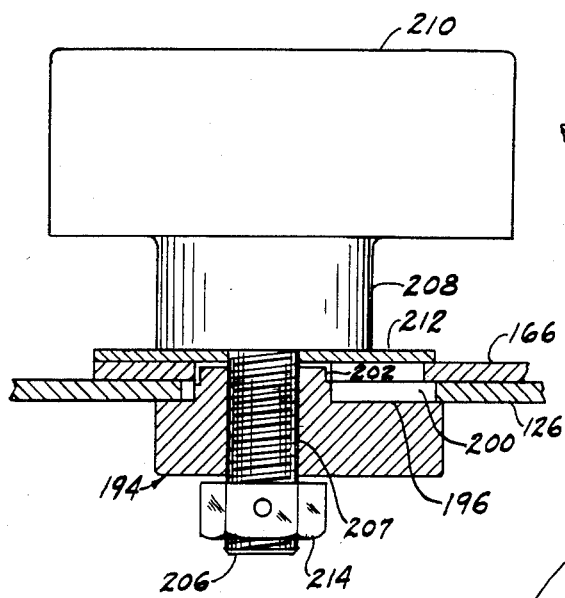
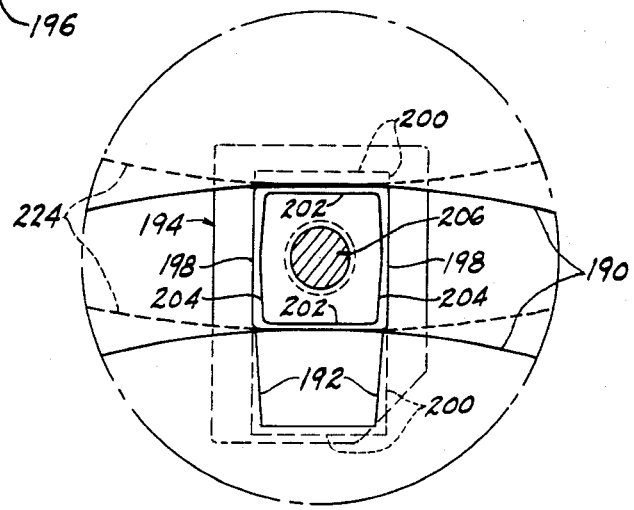
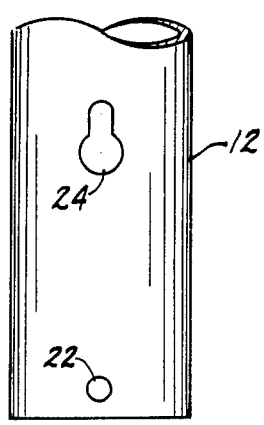

LINEAR SLIDE

This is a division of application Ser. No. 261,258 filed 5/6/81, now U.S. Pat. No. 4,453,691.

This invention relates to radial arm saws and particularly to an economical construction which is reliable in operation and convenient to adjust and adapted to convenient assembly from a knocked-down condition by a person of average skill.

OBJECTS OF THE INVENTION

The primary object of the invention is to provide a generally new and improved radial arm saw of particularly economical construction which is reliable in operation and convenient to adjust for various sawing operations;

a further object is to provide a radial arm saw construction adapted to be transported to a compact knocked-down condition and to be assembled by a person of average skill;

a further object is to provide novel and simplified means for accurately indexing and angularly positioning the radial arm in various miter positions and for positively locking it in such positions;

a further object is to provide like means employing interchangeable elements for indexing and angularly positioning and locking the arm in various miter positions and the saw blade in various bevel positions;

a further object is to provide novel and simplified radial arm elevating mechanism in which a member supporting said arm for rotation thereon encircles and is vertically slidable on a round tubular column and is keyed to the column by an elongated nut which nut is slidable in an elongated groove in the column, adjustably connected to the arm supporting member and moved vertically by a motion transmission screw journalled in the column;

a further object is to provide novel and conveniently adjustable means for supporting and slidably guiding a carriage along a radial arm, for limiting its travel along the arm and for locking it in any position along the arm;

a further object is to provide novel and simplfied means for indexing a motor supporting yoke in angular positions on a carriage in which an indexing pin is biased toward an indexing position by a spring arm which arm also serves to withdraw the pin;

a further object is to provide novel cam and lever means for locking the yoke to the carriage;

A further object is to provide novel means for clamping a fence or rear table board in position;

a further object is to provide a base to column connection which permits independent adjustment of the base members with respect to the column and with respect to each other;

these and further objects and advantages will become apparent when reading the following description in connection with the accompanying drawings.

IN THE DRAWINGS

FIG. 1 is a side elevational view of a radial arm saw constructed in accordance with the present invention;

FIG. 2 is a top plan view of the saw shown in FIG. 1 with the worktable and base deleted;

FIG. 3 is an enlarged fragmentary cross-sectional view of the upper portion of the saw taken along line 3—3 of FIG. 2;

FIG. 4 is an enlarged fragmentary plan view of the radial arm and miter index plate with the support tube and elevating screw shown in cross section and is taken along line 4—4 of FIG. 3;

FIG. 5 is an enlarged fragmentary cross-sectional view taken along line 5—5 of FIG. 3;

FIG. 6 is a fragmentary cross-sectional view taken along line 6—6 of FIG. 4;

FIG. 7 is a fragmentary cross-sectional view taken along line 7—7 of FIG. 4;

FIG. 8 is an enlarged elevational view of the motor supporting yoke with the carriage and radial arm shown in cross section and is taken along line 8—8 of FIG. 1.

FIG. 9 is a cross-sectional view taken along line 9—9 of FIG. 8;

FIG. 10 is a top plan view of the carriage shown in FIG. 9 with fragmentary portions of the radial arm shown overlying the carriage;

FIG. 11 is an enlarged fragmentary cross-sectional view taken along line 11—11 of FIG. 10;

FIG. 12 is an enlarged fragmentary cross-sectional view taken along line 12 13 of FIG. 10;

FIG. 13 is an enlarged fragmentary bottom plan view showing the yoke locking cam surfaces and is taken along line 13—13 of FIG. 12;

FIG. 14 is an enlarged fragmentary cross-sectional view of one of the cam surfaces and is taken along line 14—14 of FIG. 13;

Figure 18:
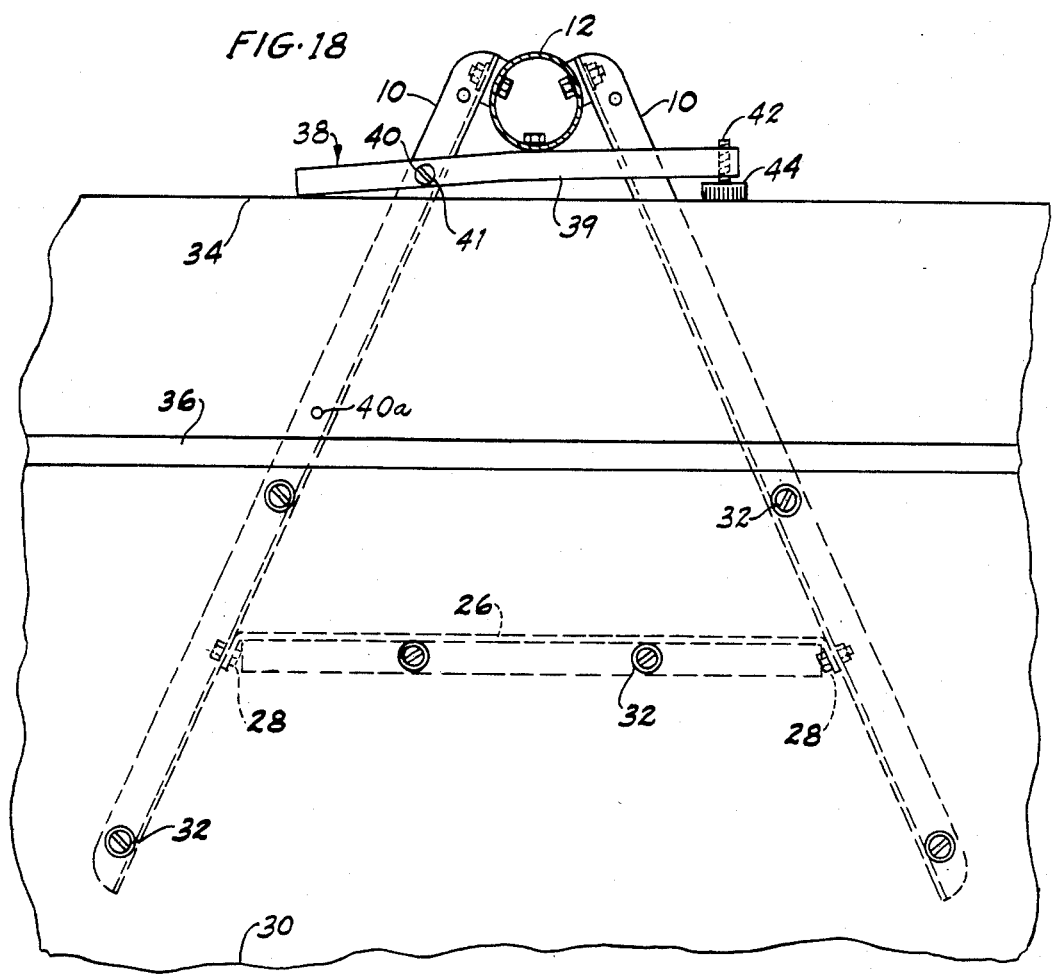
Figure 19:
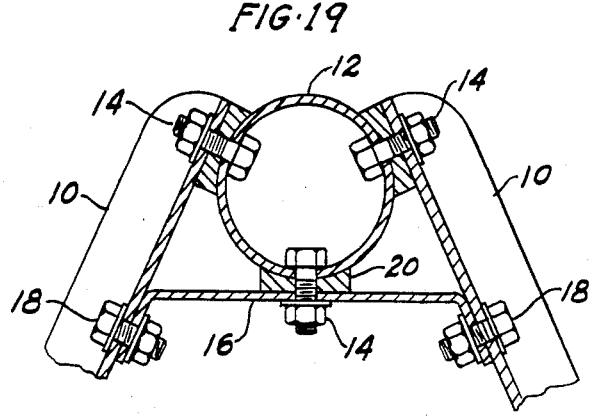

FIGS. 15 and 16 are enlarged fragmentary cross-sectional views of the bevel indexing and locking means and are taken along lines 15—15 and 16—16 respectively of FIG. 8;

FIG. 17 is an enlarged top plan view of the indexing and locking nut shown in connecting with the arcuate groove and indexing notch therein and is taken along line 17—17 of FIG. 16;

FIG. 18 is an enlarged top plan view of the worktable and base and is taken along line 18—18 of FIG. 1;

FIG. 19 is an enlarged fragmentary cross-sectional view showing the connection of the base members to the tubular support column and is taken along 19—19 of FIG. 1.

Figure 20:
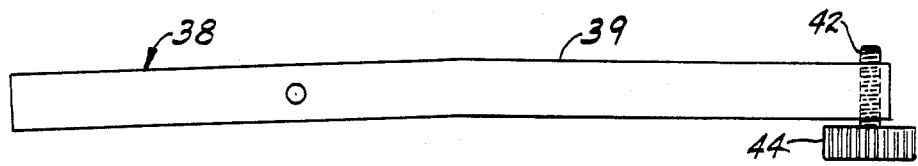

FIG. 20 is an enlarged top plan view of the fence or rear table board clamp shown alone;

FIG. 21 is a fragmentary elevational view of the lower end portion of the rear yoke leg showing the vertical and horizontally adjustable heel plates and is taken along line 21—21 of FIG. 9;

FIG. 22 is an enlarged fragmentary elevational view of the lower end portion of the rear yoke leg with the heel adjustment plates removed so as to show the vertically elongated heel adjustment slots and is taken along line 21—21 of FIG. 9;

FIGS. 23 and 24 are respectively enlarged end and side elevational views of the horizontal heel adjustment plate shown alone; and FIG. 25 is a fragmentary elevational view of the lower end portion of the tubular support column showing a lower round bolt clearance hole and an upper key-slot therein.

DESCRIPTION OF A PREFERRED FORM OF THE INVENTION

Referring to FIGS. 1, 18 and 19 of the drawings, the radial arms saw has a triangular base comprising a pair of diverging channel members 10 and a spanner bracket 16. The webs of channel members 10 and the bracket 16 are connected to the lower end portion of a round, vertical, tubular support column 12 by three upper and three lower bolts 14 which are substantially equally spaced around the tube. Two of the upper bolts and two of the lower bolts pass through the wall of tube 12 and the vertical webs of channels 10 while the third upper and lower bolts pass through the wall of tube 12 and through the spanner bracket 16. Bracket 16 in turn has its ends attached to the webs of channels 10 by bolts and nuts 18. There are spacers 20 having opposed arcuate and straight surfaces interposed between tube 12 and the webs of channel 10 and spanner bracket 16, see FIG. 19.

Referring to FIG. 25, the lower three bolts 14 pass through lower conventional round clearance holes 22 in tube 12 while the upper three bolts pass through upper key-hole shaped apertures 24 in tube 12. The lower circular portions of apertures 24 are large enough to permit entry of the heads of bolts 14 which have been previously loosely assembled with spacers 20 and nuts on channels 10 and bracket 16 thereby facilitating convenient assembly. The upper vertically elongated narrower slot portions of apertures 24, into which the bolts are moved on assembly, are yet wide enough to permit adjusting the support tube 12 relative to the channels 10 and bracket 16 when the nuts on bots 14 are loosened. It will be noted that this arrangement provides for independent adjustment of diverging base channels 10 relative to the tube 12 and to each other so that the top flanges of channels 10 on which table boards are placed may also be made level laterally.

A transverse channel member 26 spaced forward from the tube 12 spans the diverging channels 10 and has end portions of its web connected to the vertical webs of diverging channels 10 by upper and lower bolts and nuts 28. It will be understood that the bolt clearance holes in bracket 16 and in channel 26 through which bolts 18 and 28 pass are sufficiently large to permit the independent adjustment of channels 10 relative to tube 12 and relative to each other when the nuts on these bolts are slightly loosened.

Referring to FIGS. 1 and 18, a front table board 30 lies on and is attached to the upper horizontal flanges of base channels 10 and 26 by countersunk screws 32 while a rear table board 34 and a fence 36 merely lie unattached on the upper flanges of base channels 10. The rear table board and fence are pressed tightly against the front table board by a table clamp 38. Clamp 38 comprises a bar 39 pivotally mounted intermediately of its length at 40 on the top flange of a channel member 10 by a shouldered screw 41. The bar 39 has a relatively long portion thereof extending rightward from its pivot point 40 to an end portion having a thumb screw 42 threadedly engaged therein and extending therethrough. Screw 42 has a relatively large knurled head 44 on one side of said bar arranged to bear against the rear edge of the rear table board 34 and the relatively shorter portion of the bar 39 extending leftward of pivot 40 is arranged to bear at its end against the rear edge of a board 34. As screw head 44 is tightened against board 34 it is clamped firmly in place. It will be understood of course that the positions of the rear table board 34 and fence 36 may be switched or the rear table board 34 deleted and the fence 36 clamped against the table board 30. In the latter case the clamp 38 is pivoted at a forward point with the shouldered screw 41 entered into a screw threaded bore at 40a.

Referring to FIGS. 3 to 7, an upper end portion of vertical tube 12 has a longitudinally extending groove 46 formed in the wall thereof which groove is arcuate in cross section and fittingly receives substantially one half of the peripheral surface of an elongated, round, arm elevating nut 48. A hollow cylindrical arm support member 50 slidably fitted on tube 12 has its interior wall surface segmented by set back portions 52 so as to provide three substantially equal arcuate segments 54 spaced apart 120 degrees in contact with the surface of tube 12. One of the segmented surfaces 54 has a longitudinal groove 56 centered therein and extending the length of member 50. Groove 56 is semi-circular in cross section and fittingly receives substantially the other half of the peripheral surface of nut 48. Round nut 48 therefor forms a key between tube 12 and slidable member 50 preventing rotation of member 50 on tube 12.

Referring to FIG. 5, two vertically spaced headless screws 58 threadedly engaged in horizontal screw threaded bores 59 in cylindrical member 50 have conical points which enter vertically spaced annular grooves 60 formed in the surface of round nut 48. The annular grooves 60 are semi-circular in cross section and receive the conical points of screws 58 in such fitting relationship that nut 48 is fixed against rotation or axial movement in the member 50 when screws 58 are moderately tightened yet is slidable vertically in groove 46. In this arrangement tightening of screws 58 moves the round nut radially into groove 46 and provides with the other two arcuate segments 54 of member 50 a three point contact with tube 12. Also in this arrangement vertical alignment of the nut 48 in groove 46 and the vertical alignment of arcuate segments 54 with the tube 12 is achieved by variably tightening the vertically spaced screws 58.

Surrounding the cylindrical member 50 and rotatable thereon are upper and lower clamp members 62 which also have segmented arcuate surfaces 64 in contact with the exterior surface of cylindrical member 50. The vertically spaced clamp members 62 are generally circular and are split at 65 so that they may be variably tightened by screws 66 to attain alignment on member 50 for smooth rotation thereon. Referring to FIGS. 1 and 8 a radial arm 68 formed of sheet metal comprises an upper elongated inverted U-shaped member 70 having vertical walls 70a and an upper horizontal connecting wall 70b and an elongated lower inverted U-shaped member 72 having vertical walls 72a and a horizontal connecting wall 72b. The vertical walls 72a of member 72 lie inside of and contiguous with the vertical walls 70a of member 70 and are attached thereto by welding. Closure plates at the ends of members 70 and 72 are provided.

Referring to FIGS. 3 to 7, the upper clamp member 62 is connected to the horizontal wall 70b at one end of arm 68 by 2 carriage bolts 74 and by 2 flat head countersunk screws 76. The lower clamp member 62 is connected to the horizontal portion 72b of arm 68 by cap screws 78. The upper horizontal wall 70b of the arm 68 has a circular aperture therein loosely receiving a short reduced diameter portion 82 at the upper end of cylindrical member 50 and rests on an annular shoulder 84 resulting from this reduction in diameter whereby the arm is supported on member 50, see FIGS. 3 and 6.

Threadedly engaged in the round nut 48 is an elevating screw 86 having an upwardly extending portion thereof journalled in a smooth bore 88 in a cap 90 rigidly attached to the upper end of tube 12. A crank 92 is rigidly attached to the upper end of screw 86 for rotating the screw thereby to elevate and lower the arm 68. Axial movement of screw 86 in cap 90 is prevented by a nut 94 and a jamb nut and washer bearing against the lower side of cap 90 and by the crank 92 bearing against the upper side of the cap.

A carriage 96 supported for sliding movement along the arm 68 carries a depending yoke 98 thereon. Referring to FIGS. 8, 10, 11 and 12, the carriage 96, illustrated as a generally flat rectangular casting, is supported in a horizontal position along opposite sides thereof on horizontal ledges 100 which ledges are short inwardly formed horizontal lower end portions of vertical walls 72a of the radial arm member 72. A single button 102 constructed of a low friction plastic material, centrally positioned near one side of the carriage and attached thereto bears on the upper horizontal surface of one ledge 100 and supports one side of the carriage on arm 68. A pair of buttons 104 of similar material are attached to the opposite side of the carriage and spaced equi-distant longitudinally on opposite sides of centrally positioned button 102. Buttons 104 have bearing surfaces 105 bearing on the upper horizontal surface of the other ledge 100 and support the opposite side of the carriage. A button 106 mounted in the carriage in alignment with button 102 bears against the under side of the one ledge 100 to present vertical movement of that side of the carriage.

The single button 102 is carried on one end of an arm 107, see FIGS. 10 and 12, which arm is connected at its other end to carriage 96 by a cap screw 108 which cap screw extends downward through a screw threaded bore 109 in the carriage and is threadedly engaged therein. A headed adjustment screw 110 passing through arm 107 at a point between button 102 and cap screw 108 is threadedly engaged in a screw threaded bore in the carriage and provides means for adjusting the button 102 vertically. The pair of buttons 104 are each also provided with bearing surfaces 105a perpendicular to bearing surfaces 105. The surfaces 105a are arranged to bear against the inside surface of vertical wall 72a closely adjacent the ledge 100.

A pair of buttons 112 of similar material mounted in a vertical flange portion 114 of the carriage and in alignment with the bearing surfaces 105a of buttons 104 bear against the outside surface of the vertical wall portion 72a. Buttons 104 are mounted on one end of arms 116 which arms are attached near their other ends to the carriage by screws 118, see FIG. 11. Headed screws 120 passing through arms 116 at an intermediate point and being screw threadedly engaged in screw threaded bores in the carriage provide for vertical adjustment of buttons 104. Means to also adjust the buttons 104 horizontally in elongating the clearance holes in bars 116 through which screws 118 and 120 pass so that the bars may be moved longitudinally when screw 118 is slightly loosened. Also to provide for fine horizontal adjustment of buttons 104 screws 122 threadedly engaged in screw threaded bores in upstanding boss portions 124 of the carriage are provided and arranged to bear against the ends of bars 116.

To establish alignment of one side of the carriage with one vertical side wall of the radial arm the screws 118 are slightly loosened and bars 116 are adjusted longitudinally by screws 122 so that the bearing surfaces 105a of buttons 104 and buttons 112 contact opposite sides of vertical wall portion 72a. Screws 118 are then tightened. To establish horizontal alignment of the carriage with the horizontal ledges 100 the screw 110 and screws 120' are adjusted so that buttons 102 and 106 contact opposite sides of one ledge 100 and so that the contact surfaces 105 of both buttons 104 contact the upper surface of the other ledge 100.

It will be seen from the foregoing that we have provided a slidable three point contact for horizontal support of the carriage on the arm by the provision of the two buttons 104 on one side of the carriage and the single button 102 on the opposite side thereby precluding any tendency of the carriage to rock on the supporting ledges 100. It will also be noted that by guiding the carriage along only one vertical wall portion 72a of the arm that we have precluded any tendency of the carriage to bind due to slight variations in the spacing of walls 72a as the carriage is moved along the arm. Means to limit the travel of the carriage is provided by rubber bumpers 123, see FIG. 1, arranged to be engaged by the vertical flange portion 114 of the carriage. Also means to lock the carriage in any position along the arm is provided and comprises a spring shoe 119 connected to the carriage by screws 121 are arranged to be pressed against the outside of vertical wall portion 72a by a thumb screw 115. Thumb screw 115 is threadedly engaged in flange portion 114 and includes a knob 117, see FIG. 12.

The yoke 98, see FIGS. 8, 9 and 12 is constructed of sheet metal and comprises an inverted U-shaped member having vertical legs 126 and an upper horizontal connecting portion 128 lying flat against the flat lower surface of carriage 96. The vertical legs 126 are stiffened by forming the vertical edges thereof at 90 degrees to form coextending portions 127. Underlying the horizontal connecting portion 128 and connected thereto as by welding is a relatively thick rigid metal plate 130. A central bore 132 extending through the horizontal yoke portion 128 and plate 130 receives a round integral boss 134 extending downward from the carriage 96 in nice fitting relationship thereby to mount the yoke 98 for rotation on the carriage 96. Referring to FIG. 12, the cap screw 108 extends downward through the screw threaded bore 109 and projects beyond the end of boss 134 and plate 130 and has a washer 136 and a nut 138 on the projecting end.

A flat yoke locking arm 140 has one end portion interposed between washer 136 and plate 130 and is perforated at 137 for rotation on screw 108 and extends therefrom exteriorly of the yoke to an opposite end provided with a handle 141.

The undersurface of plate 130 has a pair of arcuate cam surfaces 144 formed thereon surrounding and centered on the axis of screw 108 with which the upper side of the perforated inner end portion of flat locking arm 140 is in contact, see FIGS. 13 and 14. The nut 138 is preferably provided with a friction element 139 to maintain an adjusted position thereof. Rotation of the arm 140 in a counter-clockwise direction in FIG. 13 presses the yoke portion 128 against the underside of carriage 96 and effectively locks the yoke against rotation on the carriage. The cam surfaces 144 are preferably formed on plate 130 by press extrusion.

Means for indexing the yoke 98 in the position shown in FIGS. 1, 8 and 9 of the drawings for cross cutting and in positions 90 degrees of rotation therefrom in either direction for in-ripping and out-ripping comprises a vertically arranged index pin 148 having a tapered upper end arranged to selectively enter tapered holes 150 in carriage 96, see FIGS. 9 and 10. The pin 148 is slidably guided in a vertically arranged tubular bushing 152 having an upper flange and retained in the upper horizontal yoke portion 128. The pin 148 has an end portion projecting below the lower end of bushing 152 which end portion has an intermediate reduced diameter portion loosely received in an intermediately positioned perforation in the horizontal portion of an arm 154. Arm 154 is constructed of spring metal and has one end thereof suitably connected to one yoke leg 126 at 155 and extends therefrom through a slot 156 in the opposite leg 126 and exteriorly of the yoke to an end equipped with a handle 157. The spring arm 154 is stiffened intermediately of its length by vertical flanges 159 and the connected end portion thereof is formed so as to bias the index pin 148 upward into a tapered hole 150. Depression of the arm handle 157 extracts pin 148 from a tapered hole 150. An operating handle 151 for moving the carriage and yoke along the arm is attached to the front yoke leg.

Referring to FIGS. 8 and 9, an electric saw blade driving motor 158 having an output shaft 160 is mounted for rotation on an axis perpendicular to its shaft between lower end portions of yoke legs 126. At its front side motor 158 is supported for rotation on a round disc 162 nicely fitted for rotation in a round aperture 164 in the front yoke leg 126. A bevel index plate 166 of substantially greater diameter than disc 162 lies flat against the outer surface of a leg 126 and a flat surface of motor casing portion 170 of larger diameter than disc 162 lies flat against the inner surface of the leg 126. Four cap screws 168 threadedly engaged in motor casing portion 170 pass through and rigidly attach the index plate 166 and disc 162 to the flat surface of motor casing 170. The thickness of disc 162 is a few thousandths of an inch thinner than the leg 126. The index plate 166, the circular disc 162 and motor 158 all rotate together journalled in the round aperture 164.

Referring to FIGS. 8, 9, and 21 to 24, the opposite or heel side of the motor is supported for rotation on a pin 172 welded to an elongated plate 174 and entered through a relatively large clearance aperture in the leg 126 into a suitable bore in the casing of motor 158. Plate 174 is attached in a horizontal position to the rear yoke leg 126 by carriage bolts 176 having their heads on the inside of the leg and plate 174 is provided with horizontally elongated bolt clearance holes 178 to permit the horizontally adjustment thereof. A second plate 180 having a horizontally elongated rectangular aperture 182 therein receiving the plate 174 is attached to leg 126 by carriage bolts 184 having their heads on the inside of leg 126 and is adjustable vertically by reason of the rectangular, vertically elongated bolt clearance holes 186 in the yoke leg. Vertically elongated, rectangular bolt clearance holes 188 are also provided in the yoke leg to permit the vertical movement of plate 174 with plate 180 as plate 180 is adjusted vertically. The width of vertically elongated rectangular holes 186 and 188 is such as to receive in fitting relationship the short square shank portions of conventional carriage bolts 176 and 184 whereby the bolts may be moved vertically and yet be restrained from turning when the nuts thereon are loosened to permit adjustments.

The bevel indexing plate 166 has an arcuate slot 190 therein centered on the axis of rotation of the plate 162. Index plate 166 is provided with angularly spaced indexing notches 192 therein extending radially inward from arcuate slot 190. Referring to FIGS. 8 and 15 to 17, a nut 194 of elongated rectangular shape has an upper surface 196 lying against the inner surface of front yoke leg 126. A first reduced rectangular portion of the nut extending perpendicularly from the surface 196 thereof has two opposite vertical sides 198 spaced so as to slidably fit into a radially elongated rectangular aperture 200 in the yoke leg 126. A second further reduced rectangular portion of the nut extending from the first reduced diameter portion has two opposite sides 202 extending into the arcuate slot 190 of index plate 166 and two opposite and tapered sides 204 which interfit with the opposite tapered sides of the indexing notches 192 when nut 194 is moved radially into a notch 192 from the position shown in FIG. 17.

A bolt 206 threadedly engaged in a screw threaded bore 207 in nut 194 has a shank portion extending through and from both sides of nut 194. At its upper end bolt 206 has a head comprising an enlarged diameter portion 208 with a handle 210 thereon. A large diameter washer 212 interposed between portion 208 and index late 166 overlies the index plate and spans the arcuate slot 190 and notches 192. A hexagonal adjustment nut 214 on the lower projecting end of bolt 206 is provided with a friction element 216 to maintain an adjusted position on bolt 206. The extension of the first reduced rectangular portion of nut 194 from the surface 196 is slightly less than the thickness of the yoke leg 126 and the total extension of both first and second reduced rectangular portions from the surface 196 of the nut is slightly less than the total thickness of yoke leg 126 and bevel index plate 166. Therefore, when nut 194 is tightened by turning the handle 210 the index plate 166 is rigidly clamped against the leg 126. The nut 214 is adjusted so as to permit only sufficient loosening of nut 194 to permit the sliding movement of the index plate on yoke leg 126 or the radial movement of nut 194 into and out of a notch 192.

Referring to FIG. 4, a miter index plate 218 overlies the upper surface of radial arm 68. Index plate 218 has a circular portion 220 surrounding the tubular column 12 and an arcuate portion 222 spaced radially therefrom. The miter indexing plate has an arcuate slot 224 in portion 222 and has angularly spaced indexing notches 226 extending radially outward from slot 224. Index plate 218 is fixed to the underlying cylindrical arm support member 50 by three cap screws 228.

Elongated clearance holes 229 for screws 228 permit angular adjustment of index plate 218 on member 50. The means for indexing radial arm 68 in finite angular positions in indexing notches 226 of miter index plate 218 and for clamping or locking it to the miter index plate in such indexed positions and in infinite angular positions therebetween is the same as described in connection with the indexing and clamping of the bevel index plate 166 in various bevel positions. Elements such as the nut 194, bolt 206 with handle 210, washer 212 and adjustment nut 214 are interchangeable.

I claim:

1. A radial arm saw having a hollow horizontally extending radial arm comprising a top wall and spaced vertical sidewalls having the lower edge portions thereof formed horizontally inward to form coextending ledges, a carriage having opposite sides supported for longitudinal sliding movement on said ledges, a plurality of low friction elements mounted in aligned pairs on and along one side of said carriage with the elements of each pair bearing against opposite sides of one of said vertical sidewalls thereby to guide said carriage along said one vertical sidewall, and means to support said carriage on said ledges comprising two low friction elements mounted in longitudinal spaced relationship on and along one side of said carriage and resting on one of said ledges and a single low friction element mounted on the other side of said carriage and resting on the other of said ledges and said single element being positioned longitudinally substantially between said two low friction elements.

2. The radial arm saw claimed in claim 1 in which one element of each aligned pairs is adjustably mounted on said carriage for adjustment toward or away from one side of said one vertical sidewall.

* * * * *